(12) United States Patent
Uchida

(10) Patent No.: US 9,819,025 B2
(45) Date of Patent: Nov. 14, 2017

(54) ELECTRODE FOR NON-AQUEOUS SECONDARY BATTERY

(71) Applicant: TOYOTA JIDOSHA KABUSHIKI KAISHA, Toyota-shi, Aichi-ken (JP)

(72) Inventor: Yozo Uchida, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 12 days.

(21) Appl. No.: 14/900,455

(22) PCT Filed: Jun. 11, 2014

(86) PCT No.: PCT/IB2014/001020
§ 371 (c)(1),
(2) Date: Dec. 21, 2015

(87) PCT Pub. No.: WO2014/207521
PCT Pub. Date: Dec. 31, 2014

(65) Prior Publication Data
US 2016/0149217 A1    May 26, 2016

(30) Foreign Application Priority Data
Jun. 27, 2013 (JP) ................. 2013-135588

(51) Int. Cl.
*H01M 4/62*    (2006.01)
*H01M 4/13*    (2010.01)
*H01M 10/0525*    (2010.01)
*H01M 4/04*    (2006.01)

(52) U.S. Cl.
CPC ............. *H01M 4/626* (2013.01); *H01M 4/13* (2013.01); *H01M 4/624* (2013.01); *H01M 4/625* (2013.01); *H01M 10/0525* (2013.01); *H01M 4/0404* (2013.01); *H01M 4/0433* (2013.01)

(58) Field of Classification Search
CPC ...... H01M 4/626; H01M 4/625; H01M 4/624; H01M 4/0404; H01M 4/13; H01M 10/0525
See application file for complete search history.

(56) References Cited

U.S. PATENT DOCUMENTS

| | | | |
|---|---|---|---|
| 2003/0148184 A1 | 8/2003 | Omaru et al. | |
| 2005/0058907 A1 | 3/2005 | Kurihara et al. | |
| 2007/0269718 A1 | 11/2007 | Krause et al. | |
| 2013/0089787 A1 | 4/2013 | Nagai | |
| 2013/0130090 A1 | 5/2013 | Takamori et al. | |

FOREIGN PATENT DOCUMENTS

| | | | |
|---|---|---|---|
| CN | 101454927 A | 6/2009 | |
| EP | 1 381 099 A1 | 1/2004 | |
| JP | 61-279055 | * 12/1986 | |
| JP | 10-083818 A | 3/1998 | |

(Continued)

*Primary Examiner* — Laura Weiner
(74) *Attorney, Agent, or Firm* — Sughrue Mion, PLLC

(57) ABSTRACT

An electrode for a non-aqueous secondary battery includes a current collector foil, and an electrode mixture layer provided on the current collector foil. The electrode mixture layer includes powder particles. The powder particles contain any one of metals or a metallic compound of zirconium, hafnium, zirconium carbide, hafnium carbide, and tungsten carbide as a conductive material.

1 Claim, 6 Drawing Sheets

(56) References Cited

FOREIGN PATENT DOCUMENTS

| | | |
|---|---|---|
| JP | 2000-299107 A | 10/2000 |
| JP | 2002373648 A | 12/2002 |
| JP | 2005-078943 A | 3/2005 |
| JP | 2005078933 A | 3/2005 |
| JP | 2006-310628 A | 11/2006 |
| JP | 2013-84351 A | 5/2013 |
| WO | 2011158889 A1 | 12/2011 |
| WO | 2011161754 A1 | 12/2011 |

* cited by examiner

| | | POTENTIAL RESISTANCE | |
|---|---|---|---|
| | | ○ | × |
| CONTACT RESISTANCE | ○ | ZrC,WC,TiC, HfC,Pt,Au | W,Ti |
| | × | Zr,Hf,Al | Fe,Mn etc |

POTENTIAL RESISTANCE OF WC

※CV IN BEAKER CELL
(W.E=WC, C.E=Li, R.E=Li)

AB (6%)

AB (3%) /WC (3%)

ELECTRODE FOR NON-AQUEOUS SECONDARY BATTERY

BACKGROUND OF THE INVENTION

1. Field of the Invention

The invention relates to an electrode for a non-aqueous secondary battery.

2. Description of Related Art

A technology related to a battery electrode has been known, by which an electrode is formed by feeding powder-like particles on current collector foil (for example, see Japanese Patent Application Publication No. 2005-78943 (JP 2005-78943 A)).

JP 2005-78943 A discloses an electrode formed by using composite particles for an electrode. The composite particles for an electrode are fabricated by closely adhering and integrating particles made of an electrode active material, a conductive assistant (also simply referred to as a "conductive material"), and a binder that binds the particles made of the electrode active material to the conductive assistant. The first example in JP 2005-78943 A discloses an electrode formed by using composite particles for an electrode, which are fabricated as granulated particles for an electrode by carrying out compounding of particles using a given carbon material and acetylene black (AB) as the conductive assistant.

SUMMARY OF THE INVENTION

However, in a case where a positive electrode (a positive electrode sheet) of a non-aqueous secondary battery is fabricated by powder molding, there is a problem in the granulated particles fabricated by using only acetylene black with low density as the conductive material as in JP 2005-78943 A, because acetylene black serving as the conductive material segregates (is unevenly distributed) on surfaces of the particles, thus deteriorating (increasing) batter resistance.

For example, in a case where a positive electrode mixture paste is granulated by spray-drying, acetylene black added as a conductive material segregates (is unevenly distributed) on the surfaces of the granulated particles due to migration at the time of drying. Due to this, the conductive material, which should be present inside the granulated particles as conductive paths, segregates on the surfaces of the granulated particles. As a result, a lack of conductive material happens inside the granulated particles, and conductive paths inside the granulated particles are not obtained, thereby causing a problem that resistance as an electrode (battery resistance) is increased.

Therefore, the invention provides an electrode for a non-aqueous secondary battery, in which battery resistance is reduced by restraining uneven distribution of a conductive material.

An electrode for a non-aqueous secondary battery according to a first aspect of the invention includes a current collector foil, and an electrode mixture layer provided on the current collector foil. The electrode mixture includes powder particles that are compressed. The powder particles contain at least any one of metals or a metallic compound of zirconium (Zr), hafnium (Hf), zirconium carbide (ZrC), hafnium carbide (HfC), and tungsten carbide (WC) as a conductive material.

According to the first aspect, by containing at least one of metals or the metallic compound of Zr, Hf, ZrC, HfC, and WC as the conductive material, migration is unlikely to happen in an electrode forming process, and uneven distribution of the conductive material is unlikely. Thus, conductive paths are easily ensured inside the particles, thereby reducing battery resistance.

In the first aspect, the electrode mixture layer may further contain acetylene black as the conductive material.

In the above structure, conductive paths on surfaces of the particles are ensured by acetylene black, and conductive paths inside the particles are ensured by at least one of metals or the metallic compound of Zr, Hf, ZrC, HfC, and WC. Thus, it is possible to ensure conductive paths in the entire particles in a well-balanced manner.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9A and FIG. 9B are views of images showing sections of granulated particles according to the first example and the comparative example, in which FIG. 9A is a view showing a section of the granulated particle according to the comparative example, and FIG. 9B is a view showing a section of the granulated particle according to the first example.

DETAILED DESCRIPTION OF EMBODIMENTS

Figure 1:
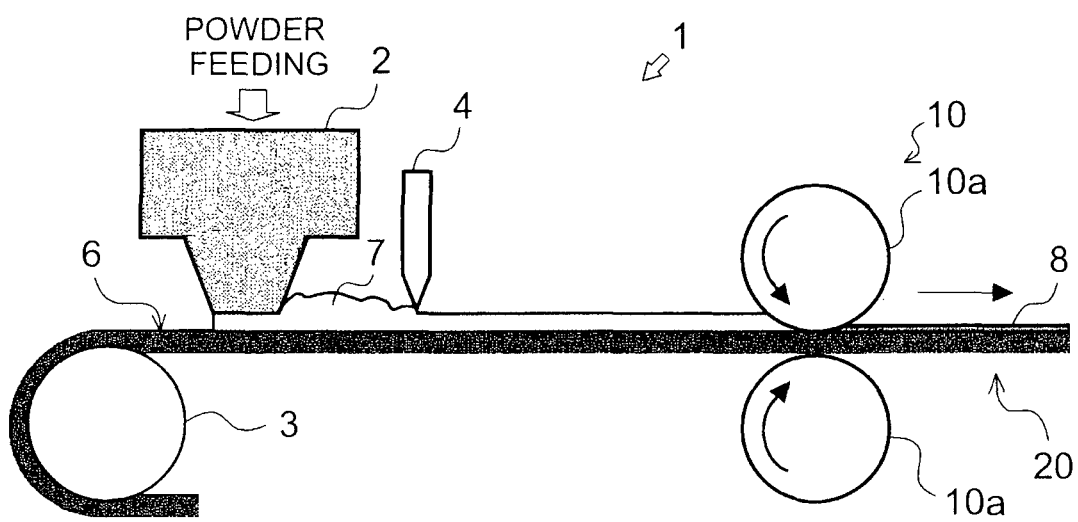
FIG. 1 is a schematic view showing a structure of a powder molding apparatus according to an embodiment of the invention.

Next, an embodiment of the invention is explained.

First of all, a lithium-ion secondary battery is explained as an example of a non-aqueous secondary battery having an electrode for a non-aqueous secondary battery according to this embodiment.

[Non-aqueous secondary battery (lithium-ion secondary battery)] For example, a lithium-ion secondary battery (not shown) is structured as a cylindrical battery, a rectangular battery, a laminate battery and so on, which is formed by storing an electrode body in a battery storage body in a state where the electrode body is superimposed or wound. The electrode body includes a sheet-like positive electrode (a positive electrode sheet) and a negative electrode (negative electrode sheet). To be specific, the lithium-ion secondary battery is manufactured as follows. The positive electrode and the negative electrode, which are formed into a sheet shape, are laminated as being superimposed, wound like a spiral or the like, through a separator, thereby forming the electrode body. Then, an electrolyte is filled in a state where the electrode body is stored in the battery storage body, and the battery storage body is sealed. The lithium-ion secondary battery manufactured as above includes the electrode body having the positive electrode, the negative electrode, and the separator, and the battery storage body that holds the electrode, body. As the electrolyte, a non-aqueous electrolytic solution, which is a liquid non-aqueous electrolyte, is used.

In the positive electrode (the positive electrode sheet), a electrode mixture layer containing electrode materials such as a positive electrode active material that is able to intercalate/de-intercalate lithium ion, a conductive material, a binder, a thickener, and so on is formed on a current collector foil. An electrode for a non-aqueous secondary battery according to this embodiment may be used as the positive electrode (the positive electrode sheet).

A positive electrode active material such as lithium transition metal compound oxide may be used as the positive electrode active material. For example, $LiCoO_2$, $LiNiO_2$, $LiMn_2O_4$, or lithium transition metal compound oxide obtained by substituting a part of $LiCoO_2$, $LiNiO_2$, $LiMn_2O_4$ for other element may be used as the positive electrode active material.

The conductive material is for ensuring electrical conductivity of the positive electrode. Although the details are explained later, it is preferred that at least one of metals or a metallic compound of Zr (zirconium), Hf (hafnium), ZrC (zirconium carbide), HfC (hafnium carbide), and WC (tungsten carbide) is used as the conductive material according to the invention. In addition to the metal or the metallic compound, it is more preferred to also use acetylene black (AB), which is a kind of carbon black, as the conductive material.

In the negative electrode (the negative electrode sheet), an electrode mixture layer containing electrode materials such as a negative electrode active material, which is able to intercalate lithium, ion at the time of charging and discharge lithium ion at the time of electric discharge, a binder, and a thickener is formed on the current collector foil.

The negative electrode is not particularly limited as long as it is possible to use a negative electrode active material having a property of intercalating lithium ion at the time of charging and discharging lithium ion at the time of electric discharge. Examples of the material having such a property include lithium metal, and a carbon material such as graphite and amorphous carbon. It is especially preferred to use a carbon material having a relatively large voltage change in accordance with charge and discharge of lithium ion, and it is more preferred to use a carbon material made of natural graphite or artificial graphite with high crystallinity.

The binder plays a role in binding and keeping together particles of the positive electrode active material and the conductive material, and particles of the negative electrode active material. The binder also plays a role in binding and keeping together these particles and the current collector foil. Examples of such a binder include polytetrafluoroethylene (PTFE), polyvinylidene fluoride (PVDF), styrene-butadiene copolymer (SBR), a fluorine-containing resin such as fluorine-contained rubber, and a thermoplastic resin such as polypropylene.

The thickener is used to add viscosity to electrode mixture paste (positive electrode mixture paste or negative electrode mixture paste). For example, polyethylene oxide (PEO), polyvinyl alcohol (PVA), and carboxymethyl cellulose (CMC) are used as the thickener. The thickener is used when viscosity is desired in the electrode mixture paste, and may thus be used as necessary.

The separator is used to electrically insulate the positive electrode and the negative electrode, and for holding the non-aqueous electrolytic solution. Examples of a material that structures the separator include a porous synthetic resin film, in particular, a porous membrane of polyolefin polymer (polyethylene, polypropylene) and so on.

For the electrolyte, a solution may be used, which is made by dissolving lithium salt such as $LiPF_6$, $LiClO_4$, $LiBF_4$ as a supporting electrolyte in a mixed organic solvent of cyclic carbonates such as ethylene carbonate (EC), propylene carbonate (PC), and vinylene carbonate (VC), and chain carbonates such as dimethyl carbonate (DMC), diethyl carbonate (DEC), and ethyl methyl carbonate (EMC).

The foregoing positive electrode (positive electrode sheet) and the negative electrode (negative electrode sheet) are, for example, superimposed or wound through the separator, thus forming the electrode body. Spaces between the electrode body, and a positive electrode terminal and a negative electrode terminal, which are lead to outside from the positive electrode and the negative electrode, are electrically connected with each other. The electrode body is stored in an appropriate battery storage body (a metallic or resin housing, a bag of laminated film made of metal such as aluminum, and so on). The non-aqueous electrolytic solution is filled between the positive electrode and the negative electrode, and the battery storage body is sealed. Thus, the lithium-ion secondary battery is structured.

Explained next is a spray drying apparatus (not shown) and a powder molding apparatus 1 that are used when manufacturing the electrode for a non-aqueous secondary battery 20 according to this embodiment.

[Spray drying apparatus] The spray drying apparatus (not shown) is an apparatus for obtaining granulated particles by splay drying electrode mixture paste that is fabricated by using an electrode mixture component containing an electrode active material, a conductive material, a binder and so on, and a dispersion solvent of the component. An example of such a spray drying apparatus is a spray-drier that carries out spray-drying by a spray-dry method. By using the spray-drier, the electrode mixture paste is sprayed into microparticle droplets, which are then dried instantaneously by being brought into contact with hot air. This way, the granulated particles are obtained. The spray-dry method in the invention is a method in which the electrode mixture paste, made by mixing the positive electrode active material, the conductive material, the binder, and the solvent, is sprayed by using the spray-drier, and is dried by hot wind, thereby forming the granulated particles containing the positive electrode active material, the conductive material, and the binder.

[Powder molding apparatus] The powder molding apparatus 1 is an apparatus for manufacturing the electrode for a non-aqueous secondary battery 20 by powder molding. To be specific, the powder molding apparatus 1 is an apparatus for manufacturing the electrode for a non-aqueous secondary battery 20. The powder molding apparatus 1 supplies granulated particles 7, which become powder-like electrode mixture obtained by the spray drying apparatus, onto a current collector foil 6, and performs press-molding (compression molding) of the current collector foil 6, to which the granulated particles 7 are fed, under given pressing conditions (heating temperature, pressing pressure), thereby forming a sheet-like electrode. As shown in FIG. 1, the powder molding apparatus 1 is structured mainly by the powder feeding apparatus 2, conveyance means 3, flattening means (a squeegee 4), and molding means 10. In manufacturing a lithium-ion secondary battery that is an example of a non-aqueous secondary battery, the powder molding apparatus 1 is applicable to, manufacturing of an electrode (an electrode sheet) in which an electrode mixture layer 8 is formed on a surface of the current collector foil 6, which is an electrode base material, by feeding the granulated particles 7 on the surface of the current collector foil 6.

The powder feeding apparatus 2 is an apparatus that feeds the powder-like granulated particles 7 onto the current collector foil 6 and forms the granulated particles 7 as a deposition layer on the current collector foil 6. The powder feeding apparatus 2 is able to feed a fixed quantity of powder of the granulated particles 7 continuously on the current collector foil 6, and deposits the granulated particles 7 on the current collector foil 6.

The current collector foil 6 is a thin and long sheet-like electrode base material that is used when manufacturing the electrode for a non-aqueous secondary battery 20. The current collector foil 6 is metallic foil (for example, aluminum foil for the positive electrode, and copper foil for the negative electrode). A given electrode mixture layer 8 is formed by the powder molding apparatus 1 on one side surface or both side surfaces (in this embodiment, one side surface) of the current collector foil 6.

The conveyance means 3' is an apparatus by which the current collector foil 6 is engaged with a plurality of rollers. The current collector foil 6 is fed from a feed roller that serves as a current collector foil feeding part (not shown) provided on an upstream side of the conveyance means 3. The conveyance means 3 then conveys the current collector foil 6 to the powder feeding apparatus 2, the squeegee 4, and the molding means 10 in this order at given conveyance speed. The conveyance means 3 is structured mainly by a plurality of guide rollers (not shown), a feed roller (not shown) serving as the current collector foil feeding part, a winding roller (not shown) serving as a current collector foil winding, part, and driving means for driving the winding roller. The winding roller is provided on a downstream side of the powder molding apparatus 1. The conveyance means 3 is able to convey the granulated particles 7, which are fed onto the current collector foil 6 from the powder feeding apparatus 2, to the downstream side by driving the driving means.

The squeegee 4 is provided on the downstream side of the powder feeding apparatus 2, and is a blade member whose distal end has an acute angle. The squeegee 4 is arranged and fixed so that the distal end faces downward and that a given interval (gap) is made between the distal end and a surface of the current collector foil 6. The squeegee 4 is flattening means for flattening the granulated particles 7 fed by the powder feeding apparatus 2 onto the current collector foil 6, and forming the deposition layer made of the powder-like granulated particles 7 having a thickness that is the same as the above-mentioned interval. The powder molding apparatus 1 according to this embodiment has the structure that includes the flattening means (the squeegee 4), but is not particularly limited to this structure. In short, the flattening means (the squeegee 4) is optional.

The molding means 10 is roll type pressure molding means provided on the downstream side of the squeegee 4, and has a plurality of pressure rollers (two rollers arranged vertically in this embodiment) 10a, 10a that are able to rotate. As the current collector foil 6, on which the deposition layer of the granulated particles 7 is formed, is inserted between the vertically-arranged two rollers 10a, 10a, the molding means 10 is able to heat and apply pressure in a thickness direction of the current collector foil, and is thus able to perform so-called roll-press processing. To be specific, while sandwiching the current collector foil 6, on which the powder-like deposition layer made of the granulated particles 7 is formed, between the pressure rollers 10a, 10a, the molding means 10 performs the roll press processing under, given hot pressing conditions (heating temperature, pressing pressure) while rotating the pressure rollers 10a, 10a in opposite directions to one another. Thus, molding means 10 is able to form the electrode mixture layer 8 with appropriately adjusted thickness and density (electrode density) on the current collector foil 6 discharged from the downstream side of the molding means 10. This way, the electrode for a non-aqueous secondary battery 20 is manufactured by the powder molding apparatus 1.

Next, a manufacturing method of the electrode for a non-aqueous secondary battery 20 according to an embodiment of the invention by using the spray drying apparatus and the powder molding apparatus 1 is explained. The manufacturing method of the electrode for a non-aqueous secondary battery 20, which is explained in this embodiment, is not particularly limited, but is applicable when manufacturing the positive electrode (the positive electrode sheet) used for the foregoing lithium-ion secondary battery that is an example of the non-aqueous secondary battery.

Figure 2:
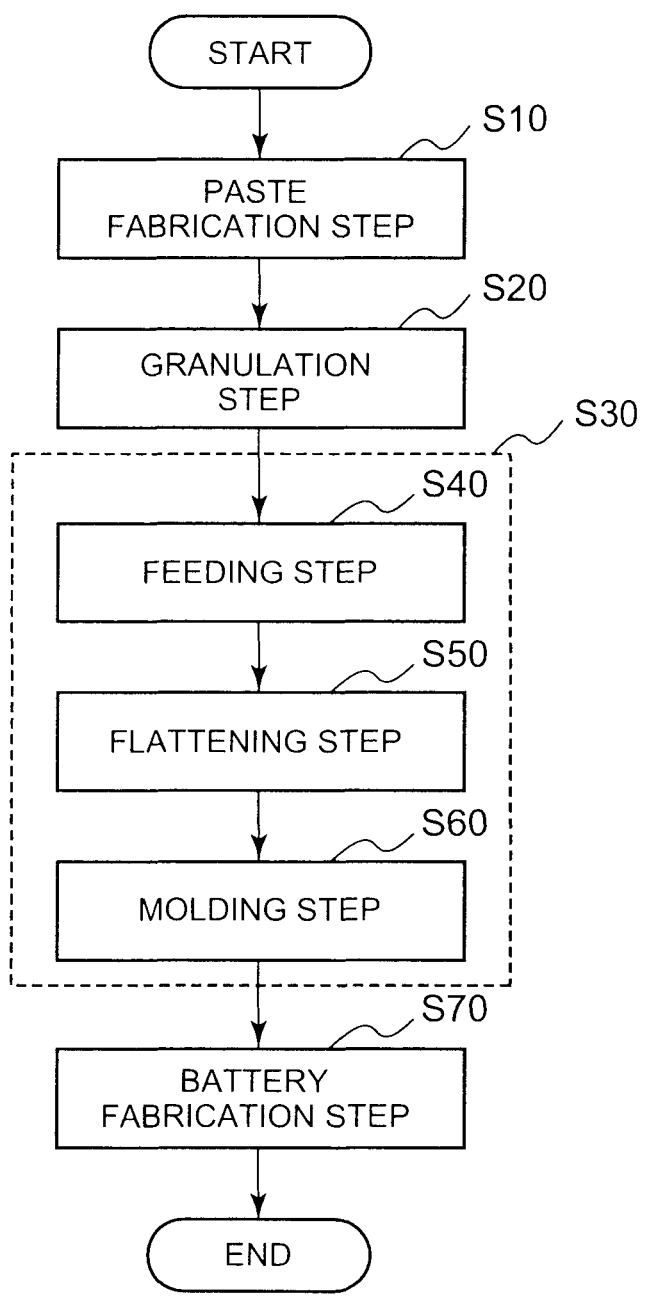
FIG. 2 is a view showing a flow of a manufacturing method of a non-aqueous secondary battery (an electrode for a non-aqueous secondary battery) according to the embodiment of the invention.

[Manufacturing method of an electrode for a non-aqueous secondary battery] A manufacturing method of the electrode for a non-aqueous secondary battery 20 according to this embodiment is a manufacturing method in which the powder-like granulated particles 7 containing the positive electrode active material, the conductive material, and the binder is formed, and a sheet-like electrode (the positive electrode) is formed by feeding the granulated particles 7 onto the current collector foil 6 and pressing (compression molding) the granulated particles 7 as shown in FIG. 2. The manufacturing method of the electrode for a non-aqueous secondary battery 20 includes mainly a paste fabrication step S10, a granulation step S20, and a powder molding step S30 (a feeding step S40, a flattening step S50, and a molding step S60), which are carried out in this order. Each of the steps is explained specifically.

Figures 3, 4:
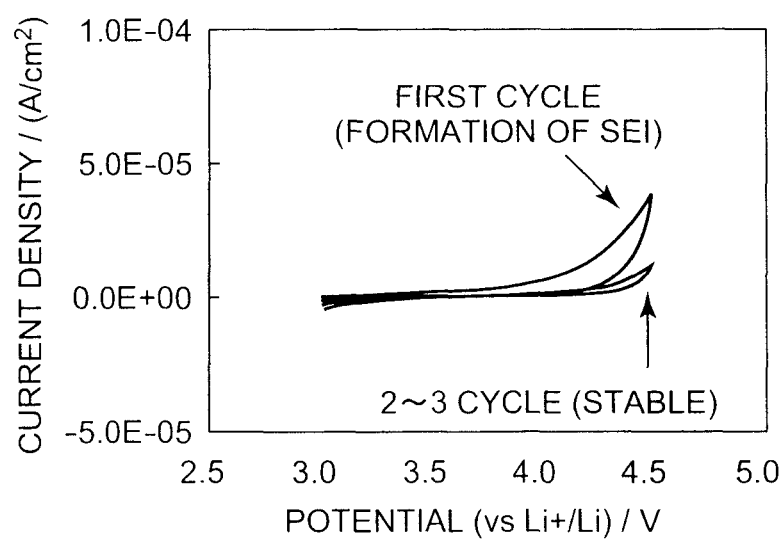
FIG. 3 is a view showing a comparative table of potential resistance and interface resistance (contact resistance) of conductive materials.
FIG. 4 is a graph showing a potential resistance (CV (cyclic voltammogram) measurement result) of WC.

The paste fabrication step S10 is a step for fabricating the electrode mixture paste (also referred to as mixture paste) with a given composition ratio and a solid content ratio by using the electrode mixture component containing the positive electrode active material, the conductive material, and the binder, and a dispersion solvent for the component. The paste fabrication step S10 is a step for preparing the electrode mixture paste used for the granulation step S20. Although details are explained later, it is preferred to use at least one type of metals or metallic compound of Zr (zirconium), Hf (hafnium), ZrC (zirconium carbide), HfC (hafnium carbide), and WC (tungsten carbide) as the conductive material used in the paste fabrication step S10. In addition to the metal and the metallic compound, it is further preferred to use acetylene black (AB), which is a kind of carbon black, as the conductive material. Further, as shown in FIG. 3, metal microparticles of Zr, Hf, ZrC, HfC, and WC belong to a metal group having potential resistance, and are favorable as an electrode material used for a non-aqueous secondary battery.

A positive electrode active material such as lithium transition metal compound oxide may be used as the positive electrode active material. As the positive electrode active material, $LiCoO_2$, $LiNiO_2$, $LiMn_2O_4$, lithium transition metal compound oxide obtained by substituting $LiCoO_2$, $LiNiO_2$, and $LiMn_2O_4$ or parts of $LiCoO_2$, $LiNiO_2$, and $LiMn_2O_4$ for other element, and so on may be used.

When using both acetylene black (a first conductive material) and metal microparticles of at least one of Zr, Hf, ZrC, HfC, and WC (a second conductive material) as the conductive material, a preferred ratio between acetylene black as the first conductive material, and the second conductive material in the total quantity of the conductive material is 0.1:99.9~99.9:0.1. A ratio of 10:90~90:10 is more preferred, and a ratio of 40:60~60:40 is even more preferred.

The binder plays a role in keeping together particles of the positive electrode active material, particles of the conductive material (the first conductive material, the second conductive material), and so on Polytetrafluoroethylene (PTFE), polyvinylidene fluoride (PVDF), styrene-butadiene copolymer (SBR), a fluorine-containing resin such as fluorine-contained rubber, and a thermoplastics resin such as polypropylene may be used as the binder.

As the dispersion solvent, an organic solvent of N-methyl-2-pyrrolidone (NMP), dimethylformamide (DMF), and dimethy acetamide (DMA), or water may be used.

The granulation step S20 is a step for forming the granulated particles by using the electrode mixture paste obtained in the paste fabrication process. To be specific, the granulation step S20 is a step for obtaining the granulated particles by spraying and drying the electrode mixture paste by heat using a spray-drier or the like that carries out spraying and heat drying in the spray-dry method. The granulation step S20 is also a step for cracking and classifying the granulated particles and fabricating granules as granulated particles having properties such as a given particle diameter and bulk density. The powder-like granulated particles 7 containing the electrode active material, the conductive material, and the binder are formed in the granulation step S20. The paste fabrication step S10 and the granulation step S20 are preparation steps for starting manufacturing of a battery electrode by using the powder molding apparatus 1.

The powder molding step S30 is a step for performing powder molding by using the powder molding apparatus 1, and includes the feeding step S40, the flattening step S50, and the molding step S60.

The feeding step S40 is a step for feeding the powder-like granulated particles 7 obtained in the granulation step S20 onto the current collector foil 6 by the powder feeding apparatus 2 included in the powder molding apparatus 1, and forming the granulated particles 7 as the deposition layer on the current collector foil 6.

The flattening step S50 is a step for flattening the powder-like granulated particles 7, fed by the powder feeding apparatus 2 onto the current collector foil 6, by using the squeegee. 4 so as to make surface of the granulated particles 7 uniform. Also, in the flattening step S50, the deposition layer of the granulated particles 7 is formed with a thickness that is the same as the given interval (gap) between the distal end of the squeegee 4 and the surface of the current collector foil 6.

The molding step S60 is a step for carrying out hot pressing of the current collector foil 6, on which the powder-like deposition layer made of the granulated particles 7, by using the molding means 10 (the pressure rollers 10a, 10a) under given hot pressing conditions (heating temperature, pressing pressure) so as to form the electrode mixture layer 8 that is thinner than the deposition layer of the granulated particles 7. This way, in the molding step S60, the positive electrode (the positive electrode sheet) is fabricated, in which the electrode mixture layer 8 is formed on the current collector foil 6 by powder molding. Thus, the electrode for a non-aqueous secondary battery 20 is fabricated. The electrode for a non-aqueous secondary battery 20 is used in the next step, which is a battery fabrication step S70.

The battery fabrication step S70 is a step for fabricating a non-aqueous secondary battery by using the electrode for a non-aqueous secondary battery 20, which is the positive electrode (the positive electrode sheet) fabricated in the powder molding process S30. To be specific, in this step, a negative electrode (a negative electrode sheet) is fabricated in a method similar to the above-mentioned manufacturing method of the electrode for a non-aqueous secondary battery 20, by using a publicly known negative electrode mixture component, a dispersion solvent for dispersing the component, and current collector foil such as copper foil. Then, the negative electrode (the negative electrode sheet), and the electrode for a non-aqueous secondary battery 20 that is the positive electrode (the positive electrode sheet) are combined through the separator, and stored in a given electrode storage body together with a non-aqueous electrolytic solution that is a liquid non-aqueous electrolyte, thereby fabricating a non-aqueous secondary battery. The non-aqueous secondary battery is manufactured as stated above.

Next, positive electrodes (positive electrode sheets) according to examples and a comparative example were manufactured by following each of the foregoing steps and using the foregoing spray drying-apparatus and the powder molding apparatus 1, and evaluation batteries were fabricated by using the positive electrodes (positive electrode sheets). The invention is specifically explained based on the examples and the comparative example.

Figure 5:
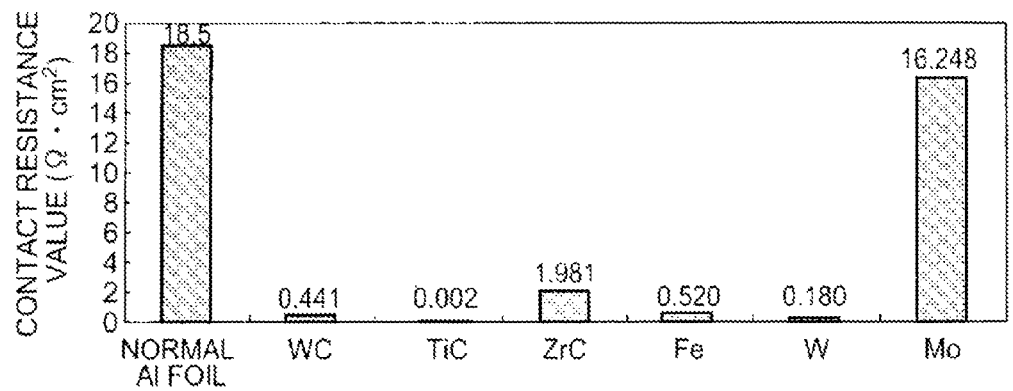
FIG. 5 is a graph showing a comparison of contact resistance values (interface resistance) of the conductive materials.

First Example (Paste fabrication step S10) First of all, four kinds of electrode mixture components, which are the positive electrode active material (in this example, ternary lithium-containing compound oxide of lithium nickel compound oxide ($LiNiO_2$), lithium manganese compound oxide ($LiMnO_2$), and lithium cobalt compound oxide ($LiCoO_2$)), acetylene black (AB) serving as the first conductive material, WC (tungsten carbide) serving as the second conductive material, polyvinylidene fluoride (PVDF) serving as the binder, were mixed at a composition ratio of 96:3:3:3, dispersed into N-methyl-2-pyrrolidone (NMP) serving as a dispersion solvent so that a solid content ratio becomes 50 wt %, and kneaded by using a kneader (a planetary mixer). Thus, an electrode mixture paste was fabricated. In this example, WC (tungsten carbide) was selected as the second conductive material. This is because WC has excellent potential resistance (see FIG. 4) and a better contact resistance value (interface resistance) compared to other metals and metallic carbide such as TiC (titanium carbide), ZrC (zirconium carbide), Fe (iron), W (tungsten), Mo (molybdenum) as shown in FIG. 5.

(Granulation step S20) Next, by using the spray-drier and the spray-dry method, the electrode mixture paste obtained in the paste fabrication step S10 was hot-air dried while being sprayed inside a furnace of the spray-drier (internal temperature inside the furnace was 180° C.). Thus, granulated particles were obtained. Then, granulated particles 7A having desired average particle diameter and particle diameter distribution were obtained by performing cracking and classifying processing of the granulated particles by given appropriate means. A publicly known method such as a ball mill may be applied to a method for cracking the granulated particles.

(Powder molding step S30 (Feeding step S40)) The powder-like granulated particles 7A obtained in the granulation step S20 were fed to the powder feeding apparatus 2 of the powder molding apparatus 1, and the granulated particles 7A were fed from a feeding port of the powder feeding apparatus 2 onto the current collector foil 6 (aluminum foil) conveyed by the conveyance means 3.

(Powder molding step S30 (Flattening step S50)) Next, the powder-like granulated particles 7A, fed onto the current collector foil 6 by the powder feeding apparatus 2, were flattened by using the squeegee 4 so that the surface of the powder-like granulated particles 7A is made uniform. Then, the deposition layer of the granulated particles 7 was formed with a thickness that is the same as an interval (gap of 170 μm) between the distal end of the squeegee 4 and the surface of the current collector foil 6.

(Powder molding step S30 (Molding step S60)) Next, the current collector foil 6, on which the powder-like deposition layer made of the granulated particles 7A is deposited, was hot pressed and molded by the molding means 10 (at pressing pressure of 30 tons) of the powder molding apparatus 1. Thus, an electrode mixture layer 8A, which is thinner than the deposition layer of the granulated particles 7A, was formed. This way, the positive electrode (the positive electrode sheet), in which the electrode mixture layer 8A made of the granulated particles 7A is formed on the current collector foil 6, was fabricated by powder molding, and an electrode for a non-aqueous secondary battery 20A (see FIG. 6) according to the first example was obtained.

Figure 6:
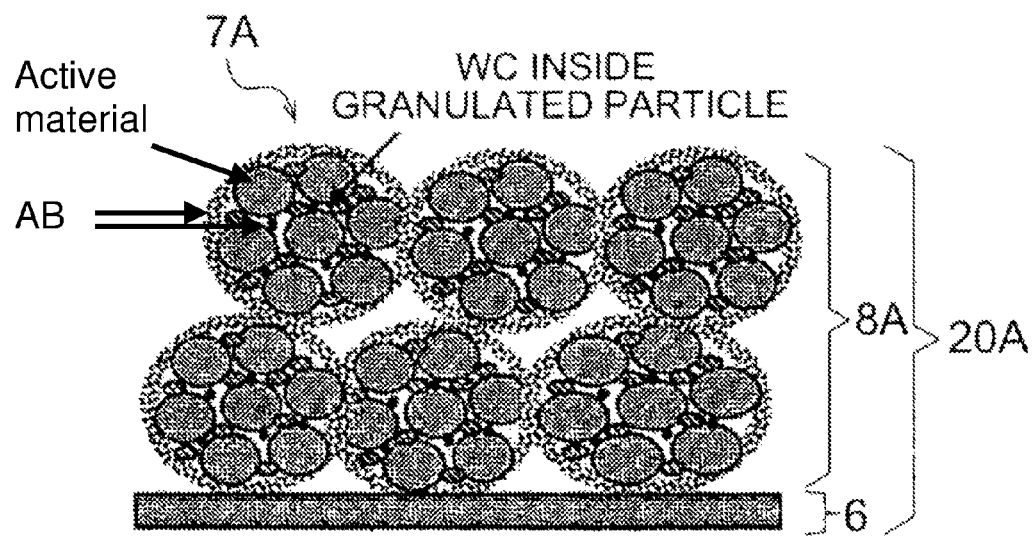
FIG. 6 is a view showing an electrode structure (an electrode structure containing 3% of AB and 3% of WC as conductive materials) according to a first example.

As shown in FIG. 6, the electrode for a non-aqueous secondary battery 20A is an electrode for a non-aqueous secondary battery, which is formed by feeding the powder-like granulated particles 7A on the current collector foil 6, and has an electrode structure that contains an active material, and AB and WC as conductive materials.

(Battery fabrication step S70) Three kinds of electrode mixture components, which are graphite serving as negative electrode active material, carboxymethyl cellulose (CMC) serving as a thickener, and styrene-butadiene copolymer (SBR) serving as a binder, were mixed at a composition ratio of 97:1:2, dispersed in water (purified water) serving as a dispersion solvent so that a solid content ratio becomes 50 wt %, and kneaded by using a kneader (a planetary mixer). Thus, a negative electrode mixture paste was fabricated. By using the negative electrode mixture paste, a negative electrode (a negative electrode sheet) having an electrode mixture layer (a negative electrode mixture layer) on current collector foil (copper foil) was fabricated in a way similar to the positive electrode (the positive electrode sheet). The electrode for a non-aqueous secondary battery 20A, which is the positive electrode (the positive electrode sheet) obtained in the powder molding step S30, and the negative electrode (the negative electrode sheet) were combined, and a size of an electrode was adjusted so that a design capacity of a battery becomes a given value. Thereafter, the electrode for a non-aqueous secondary battery 20A and the negative electrode were faced, each other through the separator so as to form an electrode body, and stored and sealed in a laminate serving as an electrode storage body together with an electrolyte that is made of a mixed solvent of ethylene carbonate (EC) and dimethyl carbonate (DMC) (at a mass ratio of 1:1 in this example) containing an appropriate amount (in a concentration of 1 M in this example) of appropriate supporting electrolyte (lithium salt of $LiPF_6$ in this example). This way, a laminate cell-type lithium-ion secondary battery was fabricated as an evaluation battery according to the first example.

Second Example

A positive electrode (a positive electrode sheet) was fabricated in a procedure similar to that of the first example except that Zr (3 wt %) was used as a second conductive material instead of instead of WC (3 wt %) that was used in the first example. Thus, an electrode for a non-aqueous secondary battery (not shown) according to a second example was obtained. An evaluation battery according to the second example was fabricated in a procedure similar to that of the first example, by using the above-mentioned positive electrode (the positive electrode sheet), and the negative electrode (the negative electrode sheet) used in the first example.

Comparative Example

Figure 7:
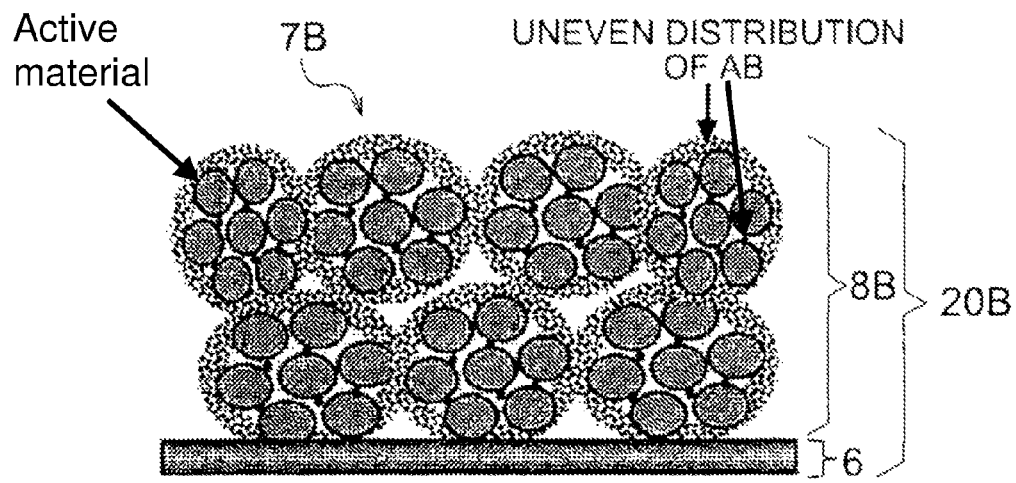
FIG. 7 is a view showing an electrode structure (an electrode structure containing 6% of AB only as a conductive material) according to a comparative example.

Three kinds of electrode mixture components, which are a positive electrode active material (ternary lithium-containing compound oxide of lithium nickel compound oxide ($LiNiO_2$), lithium manganese compound oxide ($LiMnO_2$), and lithium cobalt compound oxide ($LiCoO_2$) like the examples), acetylene black (AB) serving as a conductive material, and polyvinylidene fluoride (PVDF) serving as a binder, were mixed at a composition ratio of 96:6:3. Apart from this, procedures similar to those of the examples were used to obtain granulated particles 7B according to the comparative example, and fabricate a positive electrode (a positive electrode sheet) in which an electrode mixture layer 8B made of the granulated particles 7B is formed on current collector foil 6. Thus, an electrode for a non-aqueous secondary battery 20B according to the comparative example (see FIG. 7) was obtained. By using the positive electrode (the positive electrode sheet), and the negative electrode (the negative electrode sheet) used in the first example, an evaluation battery according to the comparative example was fabricated in a procedure similar to those of the examples.

[Measurement of IV resistance (initial resistance)] In the evaluation batteries according to the first and second examples and the comparative example, a state of charge (SOC) was adjusted to 30% from a state after electric discharge. The evaluation batteries according to the examples and the comparative example after the adjustment were caused to discharge for 10 seconds at a rate of 7.5 C (here, 30 A) at temperature of −10° C., and battery resistance (IV resistance at low temperature) was calculated from a voltage drop after 10 seconds. The results are shown in FIG. 8.

Figure 8:
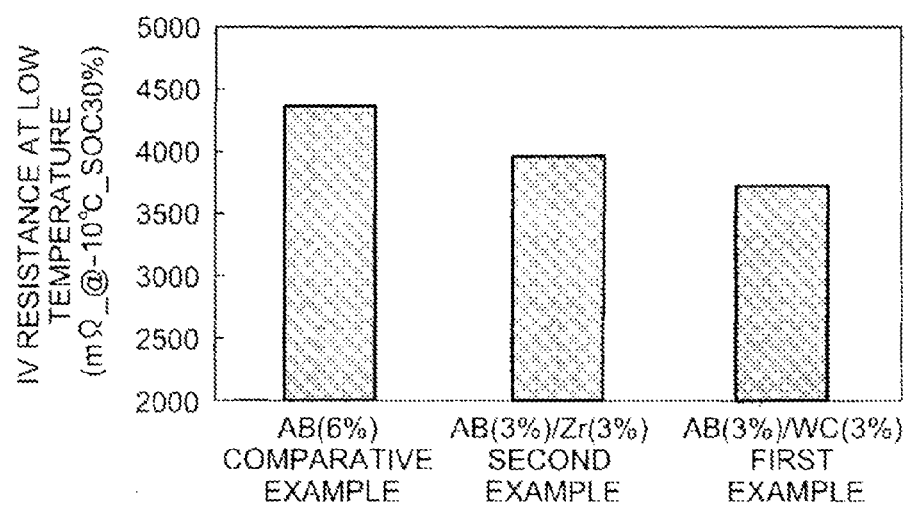
FIG. 8 is a graph showing a comparison of IV resistance at low temperature in evaluation batteries according to the first and second examples and the comparative example.

As shown in FIG. 8, it was found that, in the evaluation battery acceding to the comparative example, internal resistance sometimes increases beyond 4000 mΩ at low temperature (−10° C.). On the other hand, it was found that, in the evaluation batteries according to the first and second examples, internal resistance falls below 4000 mΩ at low temperature. It was confirmed from these results that internal resistance at low temperature was restrained sufficiently in the evaluation batteries according to the first and second examples, in which a part of acetylene black (50% of acetylene black in this example), serving as the conductive material in the composition of the electrode mixture according to the comparative example, is replaced with WC or Zr.

It was thus found that the evaluation batteries according to the first and second examples have better battery performance with reduced battery resistance compared to the evaluation battery according to the comparative example.

Figure 9A:
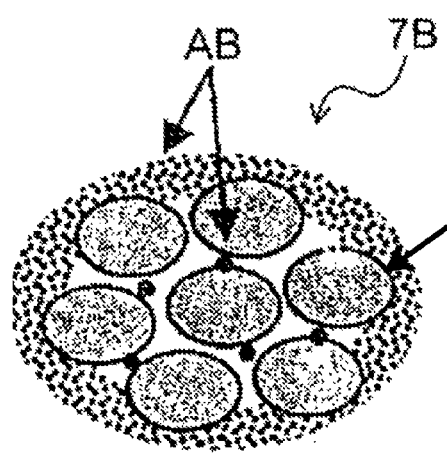
Figure 9B:
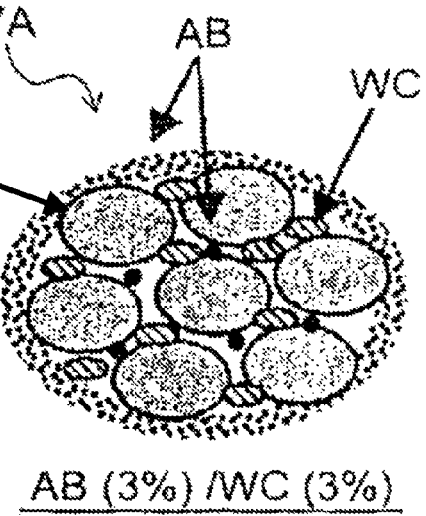

FIG. 9A and FIG. 9B show sectional images of granulated particles according to the first example and the comparative example. FIG. 9A shows a granulated particle 7B (6 wt % of AB) used when fabricating the positive electrode of the evaluation battery according to the comparative example, and FIG. 9B shows a granulated particle 7A (3 wt % of AB, 3 wt % of WC) used when fabricating a positive electrode of the evaluation battery according to the first example. Compared to the granulated particle 7B according to the comparative example shown in FIG. 9A, the granulated particle 7A according to the first example contains WC inside the granulated particle as shown in FIG. 9B, and WC is metallic carbide with low contact resistance. Therefore, it is inferred that good conductive paths are formed inside the particle. Hence, it is considered that conductivity of the electrode was improved, and battery resistance at low temperature was reduced as shown in the measurement results of the IV resistance at low temperature (see FIG. 8).

WC used in the first example and Zr used in the second example as substitutes for a part of acetylene black serving as the conductive material as stated in the embodiment are conductive materials having higher density than acetylene black and better potential resistance compared to other metals as shown in FIG. 3. Therefore, in a case where. Hf, ZrC, or HfC, which has higher density than acetylene black and better potential-resistance than other metals as shown in FIG. 3, is used as the conductive material similarly to WC used in the first example and Zr used as the second example, it is inferred that good conductive paths are formed inside granulated particles because microparticles of these metals and metallic carbide are contained in the granulated particles similarly to the cases of the first and second examples. Thus, it is considered that the similar effects as the foregoing are obtained.

When fabricating the positive electrode (the positive electrode sheet) of a lithium ion battery by powder molding, in a case where only acetylene black with low density is used as the conductive material like the comparative example, migration happens at a time of dry-spray in the granulation step. Thus, the acetylene black serving as the conductive material segregates (is unevenly distributed) on the surfaces of the granulated particles 7B. Therefore, even if an electrode is fabricated by using the granulated particles 7B, acetylene black, which is supposed to be present near an active material, segregates on the surfaces of the granulated particles 7B. Hence, the conductive material runs short inside the granulated particles 7B, and conductive paths inside the granulated particles 7B are not obtained, thereby causing an increase in resistance as an electrode (battery resistance) (see the electrode structure shown in FIG. 7). The reason why such migration happens is thought to be high-speed drying of sprayed droplets when granulating the positive electrode mixture paste by way of spray dry. In short, it is considered that, when high-speed drying of the positive electrode mixture paste is carried out by spray-dry or the like, migration happens inside the droplets, and acetylene black with low density segregates to the particle surface side following a flow of the solvent due to drying.

On the other hand, by using a metallic conductive material (Zr, Hf, ZrC, HfC, and WC in this embodiment) having higher density than acetylene black, migration in the granulation step is restrained, and the conductive material stays inside the granulated particles. Therefore, after the conductive material was molded as an electrode, the conductive material is not unevenly distributed and is present evenly across the particles (see the electrode structure shown in FIG. 6). As in the foregoing examples, by using a metallic conductive material (Zr, Hf, ZrC, HfC, and WC in this embodiment) with high density as a substitute for a part of acetylene black with low density, acetylene black works as conductive paths on the surfaces of the granulated particles, and the metallic conductive material (Zr, Hf, ZrC, HfC, and WC in this embodiment) with high density works as conductive paths inside the granulated particles. Therefore, it is possible to ensure that the conductive paths are present in the entire granulated particles in a well-balanced manner.

Even if WC and Zr used in the examples as the conductive material are changed to a metallic carbide conductive material (ZrC, HfC, TiC) or precious metal (Pt, Au) with good potential resistance and contact resistance as shown in FIG. 3, it is considered that similar effects as those in the examples are obtained.

As stated so far, according to the invention, migration is unlikely to happen in an electrode forming process by containing at least one of metals or metallic compound of Zr, Hf, ZrC, HfC, and WC as the conductive material, and uneven distribution of the conductive material is less likely. Therefore, since the conductive paths are easily ensured inside the particles, it is possible to reduce battery resistance.

According to the invention, the conductive paths on the surfaces of the particles are ensured by acetylene black, and conductive paths inside the particles are ensured by at least any one of metals or a metallic compound of Zr, Hf, ZrC, HfC, and WC. Hence, the conductive paths are ensured in the entire particles in a well-balanced manner.

The invention claimed is:

1. A positive electrode for a non-aqueous secondary battery, the positive electrode comprising:
   a current collector foil; and
   an electrode mixture layer provided on the current collector foil,
   the electrode mixture layer including powder particles that are compressed, and
   each of the powder particles containing active material particles containing a lithium transition metal compound oxide, a first conductive material containing acetylene black, and a second conductive material containing at least one of metals or a metallic compound of zirconium, hafnium, zirconium carbide, hafnium carbide, and tungsten carbide.

* * * * *